United States Patent
Huang

(10) Patent No.: US 11,500,276 B2
(45) Date of Patent: Nov. 15, 2022

(54) LIGHT SOURCE MODULE AND PROJECTION DEVICE

(71) Applicant: Coretronic Corporation, Hsin-Chu (TW)

(72) Inventor: Shou-Cheng Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 35 days.

(21) Appl. No.: 17/343,708

(22) Filed: Jun. 9, 2021

(65) Prior Publication Data
US 2022/0121095 A1   Apr. 21, 2022

(30) Foreign Application Priority Data
Oct. 15, 2020 (CN) .......................... 202022292504.9

(51) Int. Cl.
*G03B 21/20* (2006.01)
*G02B 27/30* (2006.01)

(52) U.S. Cl.
CPC ......... *G03B 21/2033* (2013.01); *G02B 27/30* (2013.01)

(58) Field of Classification Search
CPC ............ G03B 21/2053; G03B 21/2013; G03B 21/2033; G02B 27/30; H04N 9/3152; H04N 9/3161; H04N 9/3164
See application file for complete search history.

(56) References Cited

U.S. PATENT DOCUMENTS

2013/0057834 A1* 3/2013 Yoshida .................. B23P 11/00
353/38

FOREIGN PATENT DOCUMENTS

TW   201330430   7/2013
TW   201730660   9/2017

* cited by examiner

*Primary Examiner* — Ryan D Howard
(74) *Attorney, Agent, or Firm* — JCIPRNET

(57) ABSTRACT

A projection device and a light source module having a light transmitting region and a non-light transmitting region, and including a base, a light-emitting element, a collimating lens, an adhesive, and a light-shielding member are provided. The light-emitting element is disposed on the base at a position corresponding to the light transmitting region for providing a light beam. The collimating lens is disposed on the base. The adhesive is disposed on the base at a position corresponding to the non-light transmitting region, and located between the collimating lens and the base to bond the collimating lens and the base. The light-shielding member is disposed in the non-light transmitting region and covers a part of the collimating lens. A projection of the light-shielding member and a projection of the adhesive on the base at least partially overlap. The light source module and the projection device have good reliability.

18 Claims, 6 Drawing Sheets

LIGHT SOURCE MODULE AND PROJECTION DEVICE

CROSS-REFERENCE TO RELATED APPLICATION

This application claims the priority benefit of China application serial no. 202022292504.9, filed on Oct. 15, 2020. The entirety of the above-mentioned patent application is hereby incorporated by reference herein and made a part of this specification.

BACKGROUND

Technical Field

The invention relates to an optical module and an optical device, and particularly relates to a light source module and a projection device.

Description of Related Art

Recently, projection devices based on solid-state light sources such as light-emitting diodes (LEDs) and laser diodes have gradually gained a place in the market. Since laser diode has advantages of high collimation, strong energy, and is capable of converging light, it has become a mainstream light source in modern projectors. Generally, a laser light source module includes a light source base, a laser light-emitting diode, a collimating lens, and an adhesive. The laser light-emitting diode is arranged in the light source base, and the collimating lens is adhered to a frame of the light source base through the adhesive, and is placed above the laser light-emitting diode.

However, the collimating lens of the laser light source module may not only allow light emitted from the laser light-emitting diode to pass through, but may also receive stray light reflected back by an optical system sometimes, and the stray light may inevitably irradiate a place where the collimating lens is adhered to the light source base. After the light source is continuously turned on for a period of time, heat generated by the stray light and accumulated on the collimating lens may cause degradation of the adhesive, so that the collimating lens may probably fall off. Along with miniaturization of the light source module, the smaller the collimating lens is, the larger a proportion of an area occupied by the adhesive is, which makes it easier for the stray light reflected back by the optical system to irradiate the place where the collimating lens is adhered to the light source base, thereby causing the collimating lens to accumulate more heat to accelerate degradation of the adhesive of the collimating lens.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a light source module and a projection device, which have good reliability.

Other objects and advantages of the invention may be further illustrated by the technical features broadly embodied and described as follows.

In order to achieve one or a portion of or all of the objects or other objects, an embodiment of the invention provides a light source module. The light source module has a light transmitting region and a non-light transmitting region, and the light source module includes a base, a light-emitting element, a collimating lens, an adhesive, and a light-shielding member. The light-emitting element is disposed on the base at a position corresponding to the light transmitting region for providing a light beam. The collimating lens is disposed on the base. The adhesive is disposed on the base at a position corresponding to the non-light transmitting region, and is located between the collimating lens and the base to bond the collimating lens and the base. The light-shielding member is disposed in the non-light transmitting region and covers a part of the collimating lens, wherein a projection of the light-shielding member on the base and a projection of the adhesive on the base at least partially overlap.

In order to achieve one or a portion of or all of the objects or other objects, an embodiment of the invention provides a projection device. The projection device includes an illumination system, a light valve, and a projection lens. The illumination system is configured to provide an illumination light beam, and the illumination system includes the aforementioned light source module. The light valve is located on a transmission path of the illumination light beam, and is configured to convert the illumination light beam into an image light beam. The projection lens is located on a transmission path of the image light beam, and is configured to project the image light beam out of the projection device.

Based on the above description, the embodiments of the invention have at least one of the following advantages or effects. In the embodiment of the invention, through the configuration of the light-shielding member, the light-shielding member may block stray light coming from the outside of the light source module, so as to avoid the stray light from accumulating on the collimating lens at the region configured with the adhesive, thereby avoiding degradation of the adhesive, and helping to improve reliability of the light source module and the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
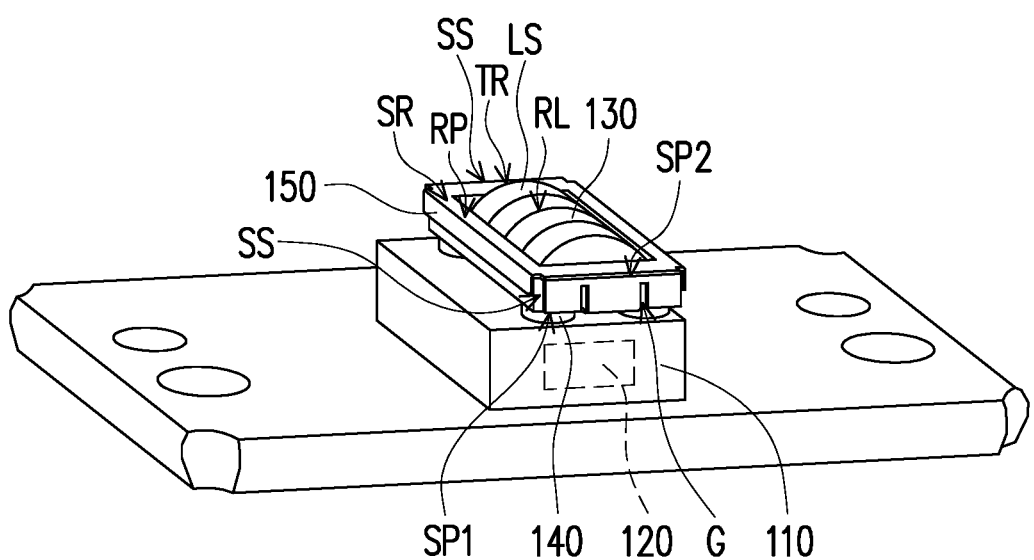
FIG. 1A is a schematic diagram of a light source module according to an embodiment of the invention.
Figure 1B:
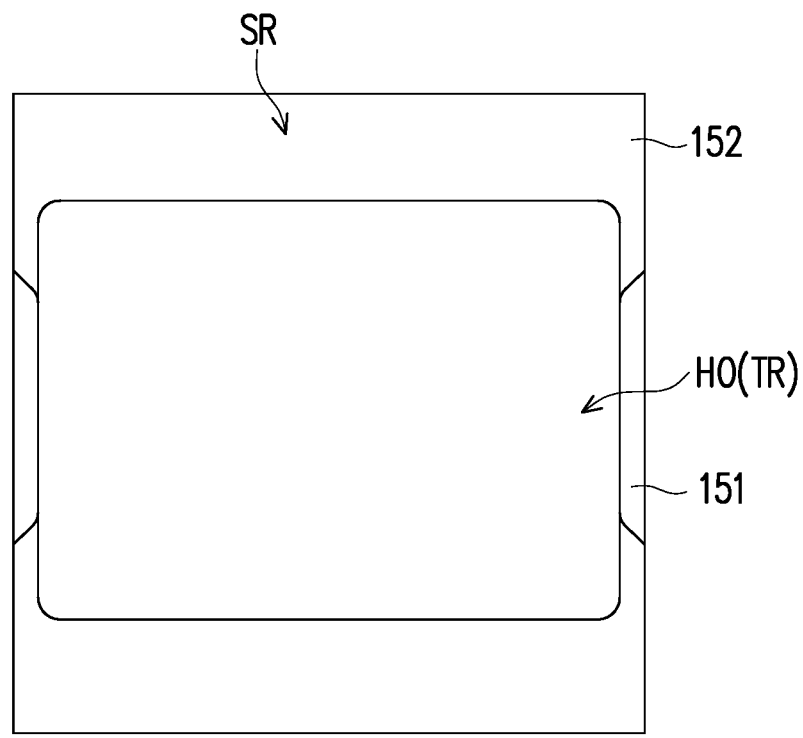
FIG. 1B is a schematic front view of a light-shielding member of FIG. 1A.
Figure 1C:
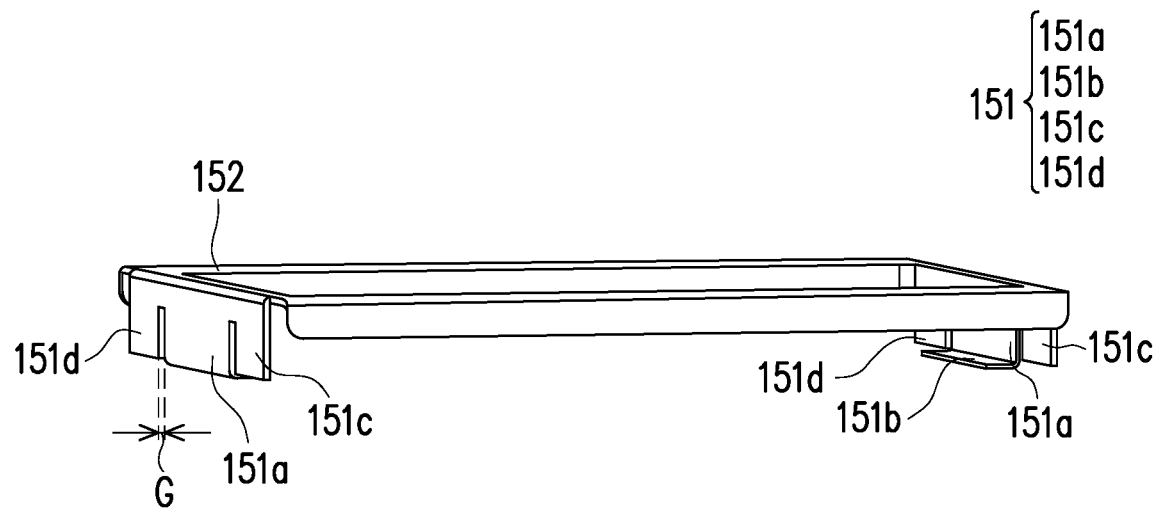
FIG. 1C is a schematic side view of the light-shielding member of FIG. 1A.
Figure 1D:
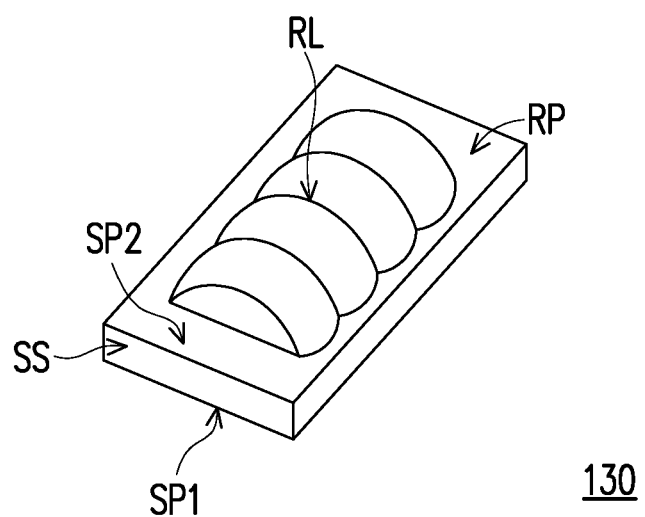
FIG. 1D is a schematic side view of a collimating lens of FIG. 1A.

FIG. 1A is a schematic diagram of a light source module according to an embodiment of the invention. FIG. 1B is a schematic front view of a light-shielding member of FIG. 1A. FIG. 1C is a schematic side view of the light-shielding member of FIG. 1A. FIG. 1D is a schematic side view of a collimating lens of FIG. 1A. Referring to 1A to FIG. 1C, the light source module 100 has a light transmitting region TR and a non-light transmitting region SR, and the light source module 100 includes a base 110, a light-emitting element 120, a collimating lens 130, an adhesive 140, and a light-shielding member 150. The light-emitting element 120 is disposed on the base 110 at a position corresponding to the light transmitting region TR for providing a light beam. For example, the light-emitting element 120 includes a plurality of blue laser diodes arranged in an array, and provides a plurality of laser light beams 50B (shown in FIG. 3A and FIG. 3B), but the invention is not limited thereto.

To be specific, as shown in FIG. 1A and FIG. 1D, in the embodiment, the collimating lens 130 is disposed on the base 110 and has a lens region RL and a plane region RP, where the plane region RP surrounds the lens region RL. In addition, the lens region RL of the collimating lens 130 has a plurality of lens elements LS, which are respectively provided corresponding to the light-emitting elements 120. For example, in the embodiment, the number of light-emitting elements 120 is four, and the number of corresponding lens elements LS is also four, but the invention is not limited thereto. On the other hand, the collimating lens 130 has a first plane SP1 and a second plane SP2 in the plane region RP. The first plane SP1 and the second plane SP2 are opposite to each other, and the first plane SP1 is closer to the base 110 than the second plane SP2. The collimating lens 130 further has two side surfaces SS opposite to each other in the plane region RP, and the two side surfaces SS connect the first plane SP1 and the second plane SP2.

On the other hand, as shown in FIG. 1A, in the embodiment, the adhesive 140 is disposed on the base 110 at a position corresponding to the non-light transmitting region SR, and is located between the collimating lens 130 and the base 110 to bond the collimating lens 130 and the base 110. The adhesive 140 is located between the first plane SP1 and the base 110. The light-shielding member 150 is disposed in the non-light transmitting region SR and covers a part of the collimating lens 130. The light-shielding member 150 covers a part of the second plane SP2. A projection of the light-shielding member 150 on the base 110 and a projection of the adhesive 140 on the base 110 at least partially overlap, and the light-shielding member 150 may shield the laser light beam 50B from irradiating the adhesive 140 after being emitted and then reflected/refracted by any object, i.e., in a direction perpendicular to the first plane SP1, stray light will not be irradiated on the adhesive 140 through the first plane SP1 of the collimating lens 130 to cause degradation of the adhesive 140.

A structure of the light-shielding member 150 is further described below.

To be more specific, as shown in FIG. 1A to FIG. 1C, the light-shielding member 150 includes a pair of engaging structures 151 and a light-shielding frame portion 152. The light-shielding member 150 partially covers the collimating lens 130, and each of the engaging structures 151 is respectively located on each of the two side surfaces SS, and the light-shielding frame portion 152 is located on the second plane SP2 of the collimating lens 130. The light-shielding frame portion 152 surrounds the lens region RL of the collimating lens 130 to form a through hole region HO, and the through hole region HO defines the light transmitting region TR. In addition, the lens region RL protrudes from the second plane SP2, and the lens region RL penetrates through the through hole region HO.

Each of the engaging structures 151 has a first plate portion 151a, a second plate portion 151b, a third plate portion 151c, and a fourth plate portion 151d. The first plate portion 151a extends from the second plane SP2 of the collimating lens 130 (an outer edge of the light-shielding frame portion 152) toward the first plane SP1 along a direction parallel to the two side surfaces SS, and the second plate portion 151b extends from an outer edge of the collimating lens 130 toward the lens region RL of the collimating lens 130 along the first plane SP1, and the first plate portion 151a and the second plate portion 151b are connected at a position corresponding to a junction of the first plane SP1 and one of the two side surfaces SS. The second plate portion 151b is located between the first plane SP1 of the collimating lens 130 and the base 110. The light-shielding frame portion 152 and the first plate portion 151a are connected at a position corresponding to a junction of the second plane SP2 and the one of the two side surfaces SS.

Further, during a process of installing the light-shielding member 150 on the collimating lens 130, the light-shielding frame portion 152, the first plate portion 151a, and the second plate portion 151b may be easily installed on the collimating lens 130 by stretching the first plate portion 151a outward, and after the first plate 151a is restored to an original position through rigidity of the first plate 151a, the light-shielding frame portion 152, the first plate portion 151a and the second plate portion 151b may jointly clamp the plane region RP of the collimating lens 130 in the direction parallel to the two side surfaces SS. In this way, the light-shielding member 150 may be stably engaged with the collimating lens 130 through the arrangement of the first plate portion 151a and the second plate portion 151b. In addition, during a process of disassembling the light-shielding member 150 from the collimating lens 130, the first plate portion 151a and the second plate portion 151b may be easily separated from the collimating lens 130 by stretching the first plate portion 151a outward, so as to disassemble the collimating lens 130.

On the other hand, the third plate portion 151c and the fourth plate portion 151d extend from the second plane SP2 (the outer edge of the light-shielding frame portion 152) of the collimating lens 130 toward the first plane SP1 in the direction parallel to the two side surfaces SS, and on each of the two sides surfaces SS, the first plate portion 151a is located between the third plate portion 151c and the fourth plate portion 151d, and there is a gap G between the third plate portion 151c and the first plate portion 151a, and there is the gap G between the fourth plate portion 151d and the first plate portion 151a. The light-shielding frame portion 152, the third plate portion 151c, and the fourth plate portion 151d are connected at a position corresponding to a junction of the second plane SP2 and one of the two side surfaces SS, and the light-shielding frame portion 152, and the pair of third plate portions 151c and the pair of fourth plate portions 151d of the pair of the engaging structures 151 jointly clamp the plane region RP and the lens region RL of the collimating lens 130 in a direction parallel to the second plane SP2. In this way, since there is the gap G between the first plate portion 151a and each of the third plate portion 151c and the fourth plate portion 151d, when the light-shielding member 150 is assembled on or disassembled from the collimating lens 130, the pair of third plate portions 151c and the pair of fourth plate portions 151d of the pair of the engaging structures 151 do not move relative to the light-shielding frame portion 152, so as to achieve a position limiting function, which facilitates alignment of the light-shielding member 150 and the collimating lens 130.

In this way, through the configuration of the light-shielding member 150, the light-shielding member 150 may block the stray light from the outside, so as to prevent the stray light from accumulating on the collimating lens 130 at the region where the adhesive 140 is distributed, thereby avoiding the degradation of the adhesive 140, which helps to improve the reliability of the light source module 100. When the light source module 100 is applied to a projection device, reliability of the projection device may also be improved, which is further explained below with reference of FIG. 2 to FIG. 3B.

Figure 2:
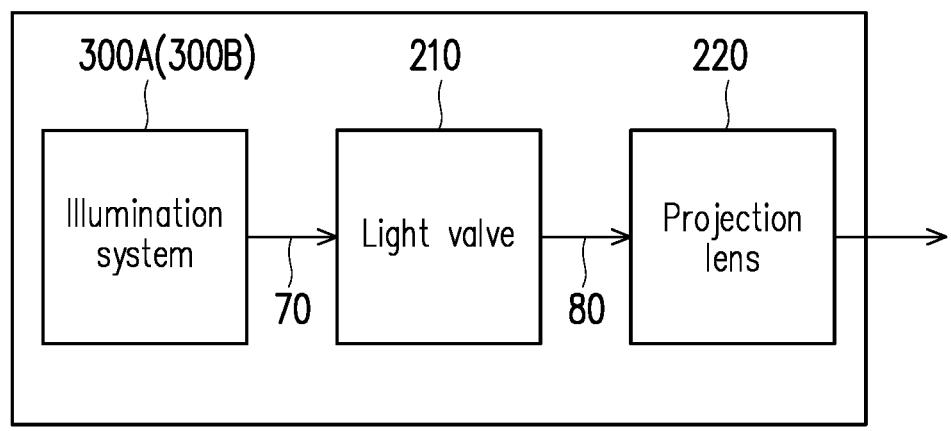
FIG. 2 is a block diagram of a projection device according to an embodiment of the invention.

FIG. 2 is a block diagram of a projection device according to an embodiment of the invention. Referring to FIG. 2, the projection device 200 includes an illumination system 300A (or an illumination system 300B), a light valve 210 and a projection lens 220. The illumination system 300A (or the illumination system 300B) is configured to provide an illumination light beam 70. The light valve 210 is disposed on a transmission path of the illumination light beam 70 coming from the illumination system 300A (or the illumination system 300B), and is configured to convert the illumination light beam 70 into an image light beam 80. The projection lens 220 is disposed on a transmission path of the image light beam 80 and is configured to project the image light beam 80 out of the projection device 200. Since after the illumination light beam 70 is converged on the light valve 210, the light valve 210 may sequentially convert the illumination light beam 70 into the image light beam 80 and transmit the image light beam 80 to the projection lens 220, an image formed through projection of the image light beam 80 converted by the light valve 210 is a color image.

In the embodiment, the projection lens 220, for example, includes one optical lens or a combination of a plurality of optical lenses with refractive powers, for example, various combinations of non-planar lenses such as a biconcave lens, a biconvex lens, a concavo-convex lens, a convexo-concave lens, a plano-convex lens, a plano-concave lens, etc. In an embodiment, the projection lens 220 may also include a planar optical lens to project the image light beam 80 coming from the light valve 210 to a projection target, for example, a screen or a wall, in a reflective or transmissive manner. The invention does not limit the pattern and type of the projection lens 220. The number of the light valve 210 is one, but the invention is not limited thereto. In other embodiments, the number of the light valves 210 may be more than one. In addition, in the embodiment, the light valve 210 may be a digital micro-mirror device (DMD) or a liquid-crystal-on-silicon panel (LCOS panel). However, in other embodiments, the light valve 210 may also be a transmissive liquid crystal panel or other light beam modulators.

Light paths in the illumination system are further explained below with reference of FIG. 3A and FIG. 3B.

Figure 3A:
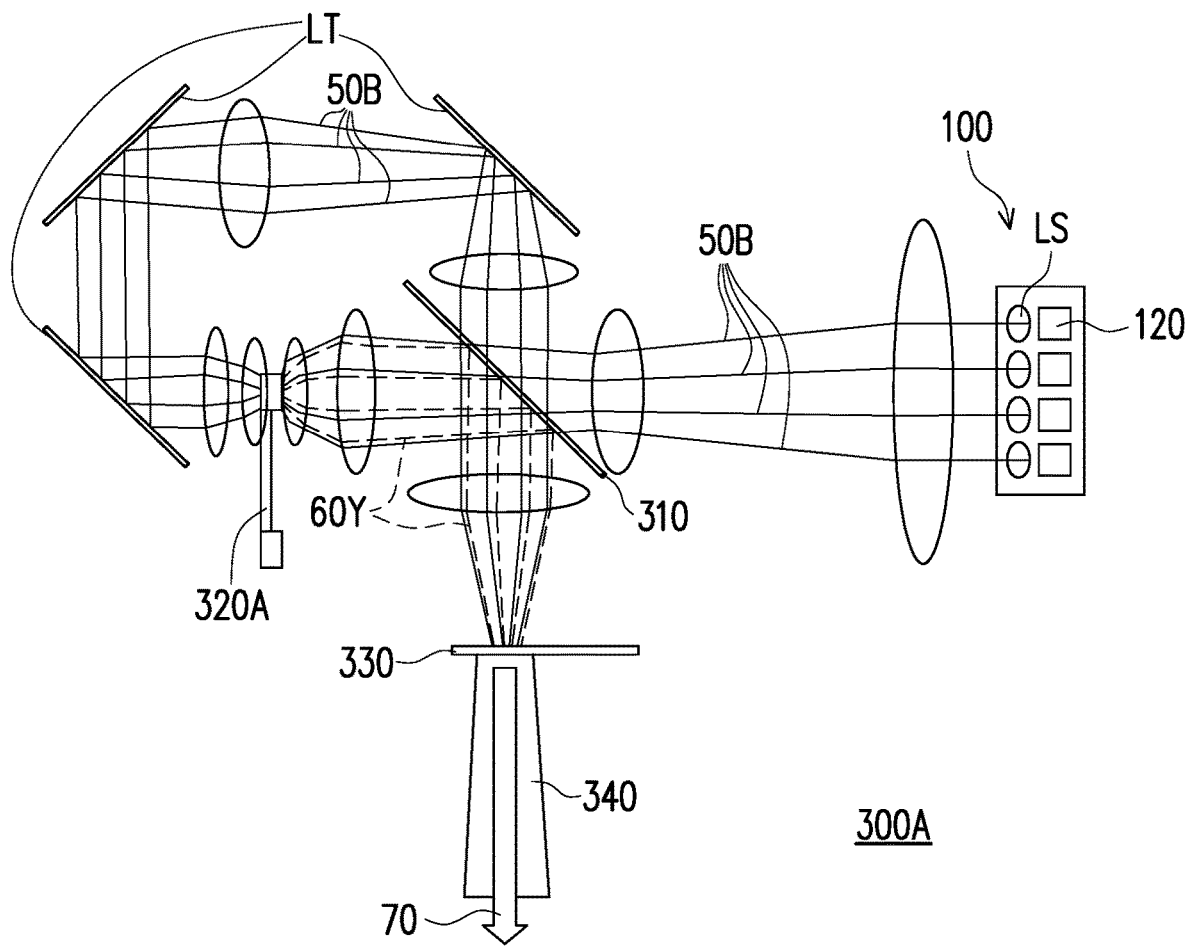
FIG. 3A is a structural schematic diagram of an illumination system of FIG. 2.

FIG. 3A is a structural schematic diagram of an illumination system of FIG. 2. To be specific, as shown in FIG. 3A, in the embodiment, the illumination system 300A includes the aforementioned light source module 100, a light splitting element 310, a wavelength conversion module 320A, a light guiding module LT, a filter module 330 and a light uniforming element 340. To be specific, as shown in FIG. 3A, in the embodiment, the light splitting element 310 is disposed on a transmission path of the laser light beam 50B, and is located between the light source module 100 and the wavelength conversion module 320A. To be specific, the light splitting element 310 may be a transflective element, a dichroic mirror, a polarization light splitting element, or various other elements that may split light beams. For example, in the embodiment, the light splitting element 310 may allow blue light beams to penetrate through, while providing a reflection function to light beams of other colors (such as red, green, yellow, etc.). In other words, the light splitting element 310 may allow the blue laser light beam 50B to pass through, so that the laser light beam 50B may penetrate the light splitting element 310 and is incident to the wavelength conversion module 320A.

For example, as shown in FIG. 3A, the wavelength conversion module 320A is located on the transmission path of the laser light beam 50B, and at least one wavelength conversion optical region of the wavelength conversion module 320A is used to convert the laser light beam 50B into at least one wavelength converted light beam 60Y, and a light passing region of the wavelength conversion module 320A allows the laser light beam 50B to pass through and transmit the same to a subsequent optical element. In addition, the wavelength conversion module 320A also includes a first actuator (not shown) for rotating the wavelength conversion module 320A, where the first actuator is used to make the light passing region and the at least one wavelength conversion optical region to enter an irradiation range of the laser light beam 50B at different times to selectively allow the laser light beam 50B to pass through or convert the same into the at least one wavelength converted light beam 60Y.

For example, as shown in FIG. 3A, the light passing region of the wavelength conversion module 320A does not have a structure of a reflective layer, and the substrate is made of transparent material. In other words, the wavelength conversion module 320A is a transmissive wavelength conversion module, and is used to make the laser light beam 50B to penetrate through. Furthermore, as shown in FIG. 3A, in the embodiment, when the light passing region (a non-conversion region) of the wavelength conversion module 320A enters the irradiation range of the laser light beam 50B, the laser light beam 50B penetrates through the wavelength conversion module 320A, and is transmitted to the subsequent optical element via the light guiding module LT. On the other hand, in the embodiment, when the at least one wavelength conversion optical region (a conversion region) of the wavelength conversion module 320A enters the irradiation range of the laser light beam 50B, the laser light beam 50B is converted into the at least one wavelength converted light beam 60Y by the at least one wavelength conversion optical region. Thereafter, as shown in FIG. 3A, the at least one wavelength converted light beam 60Y from the wavelength conversion module 320A may be guided to the light splitting element 310, and then reflected to the subsequent optical element.

As shown in FIG. 3A, the filter module 330 is located on the transmission path of the laser light beam 50B and the wavelength converted light beam 60Y. Moreover, in the embodiment, the filter module 330 has at least one filter optical region (not shown) and a light transmitting region (not shown). The filter module 330 further includes a second actuator (not shown) for rotating the filter module 330 to make the filter optical region (not shown) to correspondingly enter an irradiation range of the wavelength converted light beam 60Y at different times, so as to form red color light and green color light respectively. On the other hand, the light transmitting region (not shown) also correspondingly enters the irradiation range of the laser light beam 50B transmitted to the filter module 330 at different times to form blue color light. In this way, the laser light beam 50B and the wavelength converted light beam 60Y may be converted into the illumination light beam 70 of different colors in a time sequence.

On the other hand, as shown in FIG. 3A, in the embodiment, the light uniforming element 340 is located on a transmission path of the illumination light beam 70. In the embodiment, the light uniforming element 340 includes an integration rod, but the invention is not limited thereto. In more detail, as shown in FIG. 3A, when the illumination light beam 70 is transmitted to the light uniforming element 340, the light uniforming element 340 may uniform the illumination light beam 70 and transmit the same to the light valve 210.

As shown in FIG. 3A, in the embodiment, since efficiency of transmitting the blue laser beam 50B by the light splitting element 310 is not 100%, and efficiency of reflecting the light beams of other colors (such as red, green, yellow, etc.) is not 100%, when the laser light beam 50B from the light source module 100, the laser light beam 50B from the light guiding module LT, or the wavelength converted light beam 60Y from the wavelength conversion module 320A passes through the light splitting element 310, some stray light may be transmitted back to the light source module 100 through the light splitting element 310. At this time, through the configuration of the light-shielding member of the light source module 100, the light-shielding member may block the stray light, so as to avoid the stray light from accumulating on the collimating lens at the region configured with the adhesive, and avoid degradation of the adhesive and help to improve the reliability of the light source module and the projection device.

Figure 3B:
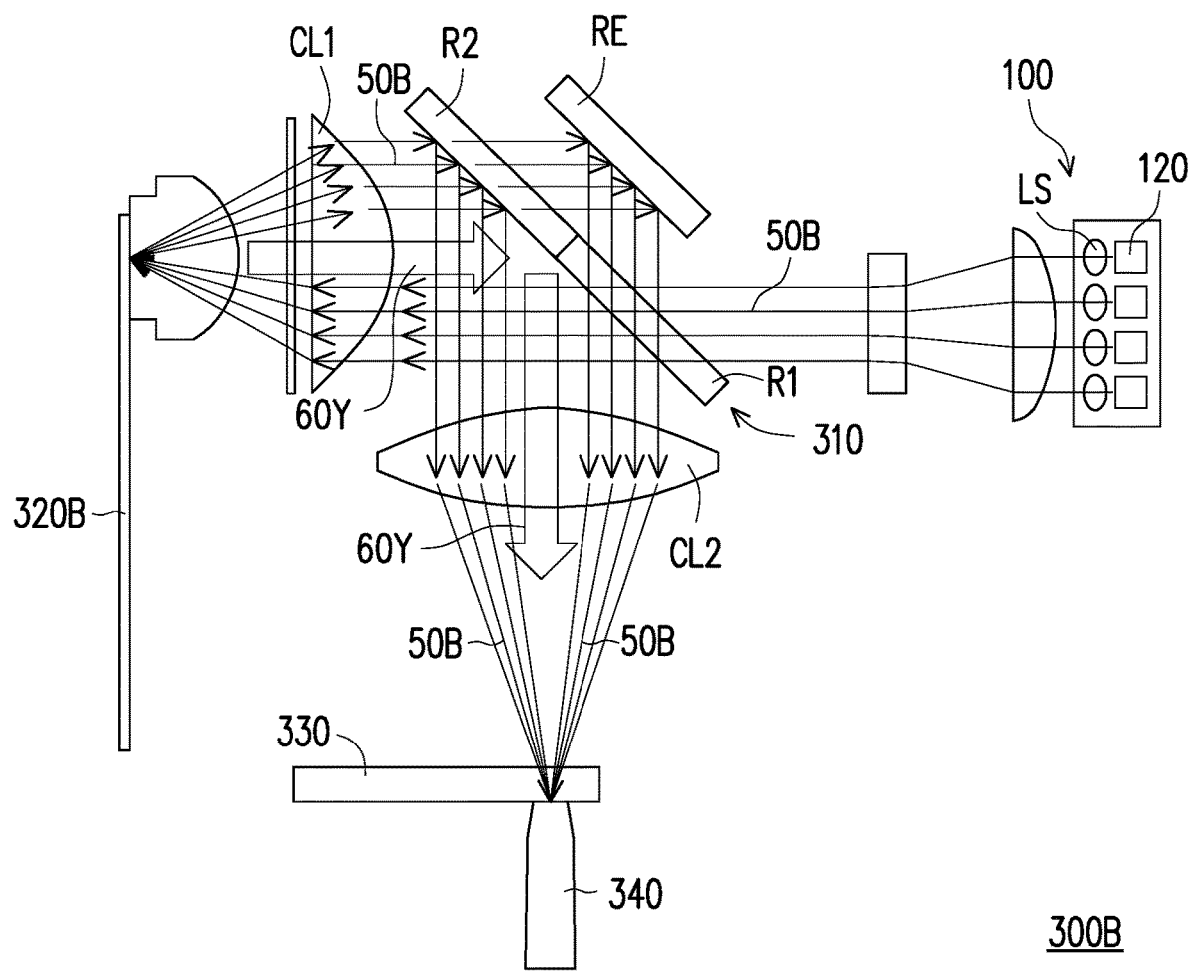
FIG. 3B is a structural schematic diagram of another illumination system of FIG. 2.

FIG. 3B is a structural schematic diagram of another illumination system of FIG. 2. Referring to FIG. 3B, an illumination system 300B of the embodiment is similar to the illumination system 300A of FIG. 3A, and differences there between are as follows. In the embodiment, a wavelength conversion module 320B adopted by the illumination system 300B has a structure of a reflective layer. Namely, the wavelength conversion module 320B is a reflective wavelength conversion module and is used to reflect an excitation light beam. Moreover, in the embodiment, as shown in FIG. 3B, the light splitting element 310 has a first region R1 and a second region R2. For example, in the embodiment, the light splitting element 310 may allow the blue light beam to penetrate through, while providing the reflection function to light beams of other colors (such as red, green, yellow, etc.). Namely, when the laser light beam 50B is incident to the first region R1 of the light splitting element 310, the first region R1 of the light splitting element 310 may allow the blue laser light beam 50B to penetrate through. In addition, as shown in FIG. 3B, in the embodiment, the light splitting element 310 and a first light converging lens CL1 are located on the transmission path of the laser light beam 50B, and the light splitting element 310 is located between at least one light source 110 and the wavelength conversion module 320B, and the first light converging lens CL1 is located between the light splitting element 310 and the wavelength conversion module 320B. In this way, when the laser light beam 50B penetrates through the first region R1 of the light splitting element 310, the laser light beam 50B may be obliquely incident to the wavelength conversion module 320B through the first light converging lens CL1, so as to form the wavelength converted light beam 60Y which is reflected from the wavelength conversion region and the laser light beam 50B which is reflected from the non-conversion region.

Further, as shown in FIG. 3B, since the wavelength converted light beam 60Y is yellow light, the wavelength converted light beam 60Y from the conversion region (not shown) of the wavelength conversion module 320B may be reflected to a light converging lens CL2 by the light splitting element 310, and converged to the filter module 330 by the light converging lens CL2. On the other hand, after the laser light beam 50B is reflected by the non-conversion region (not shown) of the wavelength conversion module 320B, the laser light beam 50B is transmitted to the second region R2 of the light splitting element 310 through the light converging lens CL1, where 50% of the laser light beam 50B penetrates through the second region R2 of the light splitting element 310, and is reflected by an optical element RE, and then penetrates through the first region R1 of the light splitting element 310, the other 50% of the laser light beam 50B is reflected by the second region R2, and is transmitted to the filter module 330 after passing through the light converging lens CL2. Thereafter, the filter module 330 respectively filters the excitation light beam and the at least one converted light beam to form the red color light, the green color light and the blue color light, respectively, and accordingly form the subsequent illumination light beam 70 and the image light beam 80.

Moreover, as shown in FIG. 3B, in the embodiment, since efficiency of transmitting the blue laser beam 50B by the first region R1 of the light splitting element 310 is not 100%, and efficiency of reflecting the light beams of other colors (such as red, green, yellow, etc.) by the light splitting element 310 is not 100%, when the laser light beam 50B from the light source module 100, or the wavelength converted light beam 60Y from the wavelength conversion module 320B passes through the light splitting element 310, some stray light may be transmitted back to the light source module 100 through the light splitting element 310. At this time, through the configuration of the light-shielding member, the light-shielding member may block the stray light, so as to avoid the stray light from accumulating on the collimating lens at the region configured with the adhesive, and avoid degradation of the adhesive and help to improve the reliability of the light source module and the projection device.

In summary, the embodiments of the invention have at least one of the following advantages or effects. In the embodiment of the invention, through the configuration of the light-shielding member, the light-shielding member may block stray light coming from the outside of the light source module, so as to avoid the stray light from accumulating on the collimating lens at the region configured with the adhesive, thereby avoiding degradation of the adhesive, and helping to improve reliability of the light source module and the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, having a light transmitting region and a non-light transmitting region, and comprising a base, a light-emitting element, a collimating lens, an adhesive, and a light-shielding member, wherein
    the light-emitting element is disposed on the base at a position corresponding to the light transmitting region for providing a light beam;
    the collimating lens is disposed on the base;
    the adhesive is disposed on the base at a position corresponding to the non-light transmitting region, and is located between the collimating lens and the base to bond the collimating lens and the base; and
    the light-shielding member is disposed in the non-light transmitting region, and covers a part of the collimating lens, wherein a projection of the light-shielding member on the base and a projection of the adhesive on the base at least partially overlap.

2. The light source module as claimed in claim 1, wherein the collimating lens has a lens region and a plane region, wherein the plane region surrounds the lens region, the collimating lens has a first plane and a second plane in the plane region, the first plane and the second plane are opposite to each other, the first plane is closer to the base than the second plane, the adhesive is located between the first plane and the base, and the light-shielding member covers a part of the second plane.

3. The light source module as claimed in claim 2, wherein the collimating lens further has two side surfaces opposite to each other in the plane region, the two sides surfaces connect the first plane and the second plane, the light-shielding member comprises a pair of engaging structures, each of the engaging structures is respectively located on each of the two side surfaces, each of the engaging structures respectively has a first plate portion and a second plate portion, the first plate portion extends from the second plane of the collimating lens toward the first plane along a direction parallel to the two side surfaces, the second plate portion extends from an outer edge of the collimating lens toward the lens region of the collimating lens along the first plane, and the first plate portion and the second plate portion are connected at a position corresponding to a junction of the first plane and one of the two side surfaces.

4. The light source module as claimed in claim 3, wherein the second plate portion is located between the first plane of the collimating lens and the base.

5. The light source module as claimed in claim 3, wherein the light-shielding member further comprises a light-shielding frame portion located on the second plane of the collimating lens, the light-shielding frame portion and the first plate portion are connected at a position corresponding to a junction of the second plane and one of the two side surfaces, and the light-shielding frame portion, the first plate portion, and the second plate portion jointly clamp the plane region of the collimating lens in a direction parallel to the two side surfaces.

6. The light source module as claimed in claim 5, wherein each of the engaging structures further respectively has a third plate portion and a fourth plate portion, the third plate portion and the fourth plate portion extend from the second plane of the collimating lens toward the first plane in the direction parallel to the two side surfaces, on each of the two sides surfaces, the first plate portion is located between the third plate portion and the fourth plate portion, there is a gap between the third plate portion and the first plate portion, and there is a gap between the fourth plate portion and the first plate portion.

7. The light source module as claimed in claim 6, wherein the light-shielding frame portion, the third plate portion, and the fourth plate portion are connected at a position corresponding to the junction of the second plane and the one of the two side surfaces, and the light-shielding frame portion, a pair of the third plate portions and a pair of the fourth plate portions of the engaging structures jointly clamp the plane region and the lens region of the collimating lens in a direction parallel to the second plane.

8. The light source module as claimed in claim 5, wherein the light-shielding frame portion surrounds the lens region of the collimating lens to form a through hole region, and the through hole region defines the light transmitting region.

9. The light source module as claimed in claim 8, wherein the lens region protrudes from the second plane, and the lens region penetrates through the through hole region.

10. A projection device, comprising an illumination system, a light valve, and a projection lens, wherein
the illumination system is configured to provide an illumination light beam, and comprises a light source module, the light source module has a light transmitting region and a non-light transmitting region, and comprises a base, a light-emitting element, a collimating lens, an adhesive, and a light-shielding member, wherein
the light-emitting element is disposed on the base at a position corresponding to the light transmitting region for providing a light beam;
the collimating lens is disposed on the base;
the adhesive is disposed on the base at a position corresponding to the non-light transmitting region, and is located between the collimating lens and the base to bond the collimating lens and the base; and
the light-shielding member is disposed in the non-light transmitting region, and covers a part of the collimating lens, wherein a projection of the light-shielding member on the base and a projection of the adhesive on the base at least partially overlap;
the light valve is located on a transmission path of the illumination light beam, and is configured to convert the illumination light beam into an image light beam; and
the projection lens is located on a transmission path of the image light beam, and is configured to project the image light beam out of the projection device.

11. The projection device as claimed in claim 10, wherein the collimating lens has a lens region and a plane region, wherein the plane region surrounds the lens region, the collimating lens has a first plane and a second plane in the plane region, the first plane and the second planes are opposite to each other, the first plane is closer to the base than the second plane, the adhesive is located between the first plane and the base, and the light-shielding member covers a part of the second plane.

12. The projection device as claimed in claim 11, wherein the collimating lens further has two side surfaces opposite to each other in the plane region, the two sides surfaces connect the first plane and the second plane, the light-shielding member comprises a pair of engaging structures, each of the engaging structures is respectively located on each of the two side surfaces, each of the engaging structures respectively has a first plate portion and a second plate portion, the first plate portion extends from the second plane of the collimating lens toward the first plane along a direction parallel to the two side surfaces, the second plate portion extends from an outer edge of the collimating lens toward the lens region of the collimating lens along the first plane, and the first plate portion and the second plate portion are connected at a position corresponding to a junction of the first plane and the two side surfaces.

13. The projection device as claimed in claim 12, wherein the second plate portion is located between the first plane of the collimating lens and the base.

14. The projection device as claimed in claim 12, wherein the light-shielding member further comprises a light-shielding frame portion located on the second plane of the collimating lens, the light-shielding frame portion and the first plate portion are connected at a position corresponding to a junction of the second plane and one of the two side surfaces, and the light-shielding frame portion, the first plate portion, and the second plate portion jointly clamp the plane region of the collimating lens in a direction parallel to the two side surfaces.

15. The projection device as claimed in claim 14, wherein each of the engaging structures further respectively has a third plate portion and a fourth plate portion, the third plate portion and the fourth plate portion extend from the second plane of the collimating lens toward the first plane in the direction parallel to the two side surfaces, on each of the two sides surfaces, the first plate portion is located between the third plate portion and the fourth plate portion, there is a gap between the third plate portion and the first plate portion, and there is a gap between the fourth plate portion and the first plate portion.

16. The projection device as claimed in claim 15, wherein the light-shielding frame portion, the third plate portion, and the fourth plate portion are connected at a position corresponding to the junction of the second plane and one of the two side surfaces, and the light-shielding frame portion, a pair of the third plate portions and a pair of the fourth plate portions of the engaging structures jointly clamp the plane region and the lens region of the collimating lens in a direction parallel to the second plane.

17. The projection device as claimed in claim 14, wherein the light-shielding frame portion surrounds the lens region of the collimating lens to form a through hole region, and the through hole region defines the light transmitting region.

18. The projection device as claimed in claim 17, wherein the lens region protrudes from the second plane, and the lens region penetrates through the through hole region.

* * * * *